(12) United States Patent
Chao et al.

(10) Patent No.: US 12,190,234 B2
(45) Date of Patent: Jan. 7, 2025

(54) ANOMALY DETECTION DEVICE AND ANOMALY DETECTION METHOD BASED ON GENERATIVE ADVERSARIAL NETWORK ARCHITECTURE

(71) Applicant: Industrial Technology Research Institute, Hsinchu (TW)

(72) Inventors: Yi-Hsiang Chao, Taoyuan (TW); Chih-Hung Hsieh, Taoyuan (TW); Ming-Yu Shih, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 951 days.

(21) Appl. No.: 17/137,221

(22) Filed: Dec. 29, 2020

(65) Prior Publication Data

US 2022/0156580 A1   May 19, 2022

(30) Foreign Application Priority Data

Nov. 16, 2020 (TW) ................................ 109139875

(51) Int. Cl.
*G06N 3/08* (2023.01)
*G06F 16/23* (2019.01)
*G06N 3/045* (2023.01)

(52) U.S. Cl.
CPC .......... *G06N 3/08* (2013.01); *G06F 16/2365* (2019.01); *G06N 3/045* (2023.01)

(58) Field of Classification Search
CPC .......... G06T 2207/20081; G06T 2207/20084; G06N 3/08; G06N 3/045; G06N 3/088; G06F 16/2365
See application file for complete search history.

(56) References Cited

U.S. PATENT DOCUMENTS

| 11,961,219 B2* | 4/2024 | Brauer ................... G06N 3/045 |
| 2018/0293734 A1 | 10/2018 | Lim et al. |

(Continued)

FOREIGN PATENT DOCUMENTS

| CN | 109410179 A | 3/2019 |
| CN | 110088619 A | 8/2019 |

(Continued)

OTHER PUBLICATIONS

Schlegl, Thomas, et al., "Unsupervised Anomaly Detection With Generative Adversarial Networks to Guide Marker Discovery", International Conference on Information Processing in Medical Imaging, 2017, 12 pages, Proceedings, US.

(Continued)

*Primary Examiner* — Chris Parry
*Assistant Examiner* — Abderrahmen Chouat (57) ABSTRACT

An anomaly detection device based on a generative adversarial network architecture, which uses the single-type training data composed of multiple normal signals to train an anomaly detection model. The anomaly detection device includes an encoder, a generator, a discriminator, and a random vector generator. In the training phase of anomaly detection model, the random latent vectors generated by the random vector generator are sequentially input to a generator to generate the synthesized signals with the same dimension as the normal signals. The synthesized signals are sequentially input into a discriminator to output the corresponding discriminant values. When the corresponding discriminant values are under the predetermined threshold, the corresponding synthesized signals are selected as the anomalous class training data, and the real normal signals are selected as the normal class training data.

15 Claims, 4 Drawing Sheets

(56) References Cited

U.S. PATENT DOCUMENTS

| | | | |
|---|---|---|---|
| 2018/0307455 A1* | 10/2018 | Cerqueira | G06F 3/1454 |
| 2018/0336471 A1 | 11/2018 | Rezagholizadeh et al. | |
| 2019/0147343 A1 | 5/2019 | Lev et al. | |
| 2019/0197358 A1* | 6/2019 | Madani | G06N 3/045 |
| 2020/0320769 A1* | 10/2020 | Chen | G06F 18/214 |
| 2021/0073630 A1* | 3/2021 | Zhang | G06N 3/08 |
| 2021/0089903 A1* | 3/2021 | Murray | G06F 18/2132 |
| 2021/0201003 A1* | 7/2021 | Banerjee | G06V 10/82 |
| 2022/0066459 A1* | 3/2022 | Jain | G05D 1/617 |
| 2022/0121932 A1* | 4/2022 | Kalarot | G06T 3/4046 |
| 2022/0138506 A1* | 5/2022 | Elenes | G06F 18/2193 382/157 |
| 2022/0222929 A1* | 7/2022 | Gauerhof | G06V 10/82 |
| 2022/0405586 A1* | 12/2022 | Yonetani | G06N 3/084 |
| 2022/0415019 A1* | 12/2022 | Wang | G06V 10/764 |

FOREIGN PATENT DOCUMENTS

| | | |
|---|---|---|
| CN | 110097028 A | 8/2019 |
| CN | 110097103 A | 8/2019 |
| CN | 110263807 A | 9/2019 |
| CN | 110298235 A | 10/2019 |
| KR | 20190101690 A | 9/2019 |
| TW | 201923582 | 6/2019 |
| TW | 202001681 A | 1/2020 |
| TW | 202024612 A | 7/2020 |
| TW | 202028849 A | 8/2020 |

OTHER PUBLICATIONS

Zenati, Houssam, et al., "Adversarially Learned Anomaly Detection", Proceedings of the 20th IEEE International Conference on Data Mining (ICDM), 2018, 11 pages, IEEE, US.

Zenati, Houssam, et al., "Efficient GAN-Based Anomaly Detection", IEEE International Conference on Data Mining (ICDM), 2018, pp. 1-7, IEEE, US.

Akcay, Samet, et al., "GANomaly:Semi-SupervisedAnomaly Detectionvia Adversarial Training", Asian Conference on Computer Vision, 2018, pp. 1-14, US.

Deecke, Lucas, et al., "Image Anomaly Detection with Generative Adversarial Networks", Joint European Conference on Machine Learning and Knowledge Discovery in Databases, 2018, 16 pages, US.

Akcay Samet, et al., "Skip-GANomaly Skip Connected and Adversarially Trained Encoder-Decoder Anomaly Detection", International Joint Conference on Neural Networks (IJCNN), 2019, 8 pages, US.

Taiwan Patent Office, Office Action, Patent Application Serial No. 109139875, Sep. 15, 2021, Taiwan.

* cited by examiner

ANOMALY DETECTION DEVICE AND ANOMALY DETECTION METHOD BASED ON GENERATIVE ADVERSARIAL NETWORK ARCHITECTURE

CROSS-REFERENCE TO RELATED APPLICATION

The present application is based on, and claims priority from, Taiwan Application Serial Number 109139875, filed Nov. 16, 2020, the disclosure of which is hereby incorporated by reference herein.

TECHNICAL FIELD

Technical Field

The present disclosure relates to an anomaly detection device and an anomaly detection method based on generative adversarial network architecture with exclusive learning capabilities.

Background

In the initial stage of the application of artificial intelligence for defect detection in the industry, the numbers of defects and normal samples may be extremely imbalanced. There are even only normal samples, the number of defects is insufficient. Generally speaking, defect patterns are diverse and unfixed, and it becomes difficult to collect all possible defect samples for training. Therefore, it is difficult to use the supervised learning method to build a high-accuracy defect detection model.

Therefore, how to build a defect detection model from only normal samples without defect samples is one of the directions that can be improved in this field.

SUMMARY

In order to achieve the above ideas, one example of an anomaly detection device based on a generative adversarial network architecture is provided, wherein the anomaly detection device uses the single-type training data composed of a group of normal signals to train an anomaly detection model. The anomaly detection device includes: an encoder, a generator, a discriminator and a random vector generator. The encoder is configured to encode an input signal into an output latent vector. The generator is connected to the encoder. The generator is configured to generate a synthesized signal using an input latent vector. The synthesized signal has the same dimension as the normal signal. The discriminator is connected to the generator. The discriminator is configured to determine whether the input signal is real or fake and output a discriminant value discriminator. The random vector generator is configured to generate a plurality of random latent vectors. In addition, the anomaly detection model training comprises the first training stage and the second training stage, the random latent vectors are sequentially input to the generator to generate a plurality of synthesized signals with the same dimension as the normal signals; each one of the synthesized signals is input in sequence into the discriminator to output a corresponding discriminant value, and when one of the discriminant values is under the predetermined threshold, the corresponding synthesized signal is selected as a training synthesized abnormal signal.

In order to achieve the above ideas, another example of an anomaly detection method suitable for a system comprising a processor and a memory is provided. The memory includes a plurality of instructions that can be executed by the processor, and the processor is configured to implement the anomaly detection method based on a generative adversarial network. The anomaly detection method for training the generative adversarial network comprises the following steps: providing the single-type training data composed of a group of normal signals; training a discriminator of the generative adversarial network while fixing a plurality of internal parameters of an encoder a generator of the generative adversarial network in the first training stage, and inputting the single-type training data from the normal signals sequentially into the encoder to output the corresponding first latent vectors, and then inputting the corresponding first latent vectors into the generator, so as to generate the corresponding first reconstruction signals; in the first training stage, adjusting the internal parameters of the discriminator with the goal of making the corresponding discriminant values smaller when inputting the first reconstruction signals into the discriminator, and adjusting the internal parameters of the discriminator with the goal of making the corresponding discriminant values larger when inputting the single-type training data from the normal signals into the discriminator; and generating a plurality of random latent vectors and inputting them into the generator to generate a plurality of synthesized signals with the same dimension as the normal signals. Each one of the synthesized signals is input in sequence into the discriminator to output a corresponding discriminant value, and when one of the discriminant values is under the predetermined threshold, the corresponding synthesized signal is selected as a training synthesized abnormal signal.

In some embodiments, the predetermined threshold is set to distinguish the training synthesized abnormal signals from the normal signals. The normal signal may be an image of the surface state of the test object obtained by an optical instrument in an automatic optical inspection system.

DETAILED DESCRIPTION

The following description is of carrying out the disclosure. This description is made for the purpose of illustrating the general principles of the disclosure and should not be taken in a limiting sense. The scope of the disclosure is best determined by reference to the appended claims.

The present disclosure is described with respect to particular embodiments and with reference to certain drawings, but the disclosure is not limited thereto and is only limited by the claims. It will be further understood that the terms "comprises," "comprising," "comprises" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
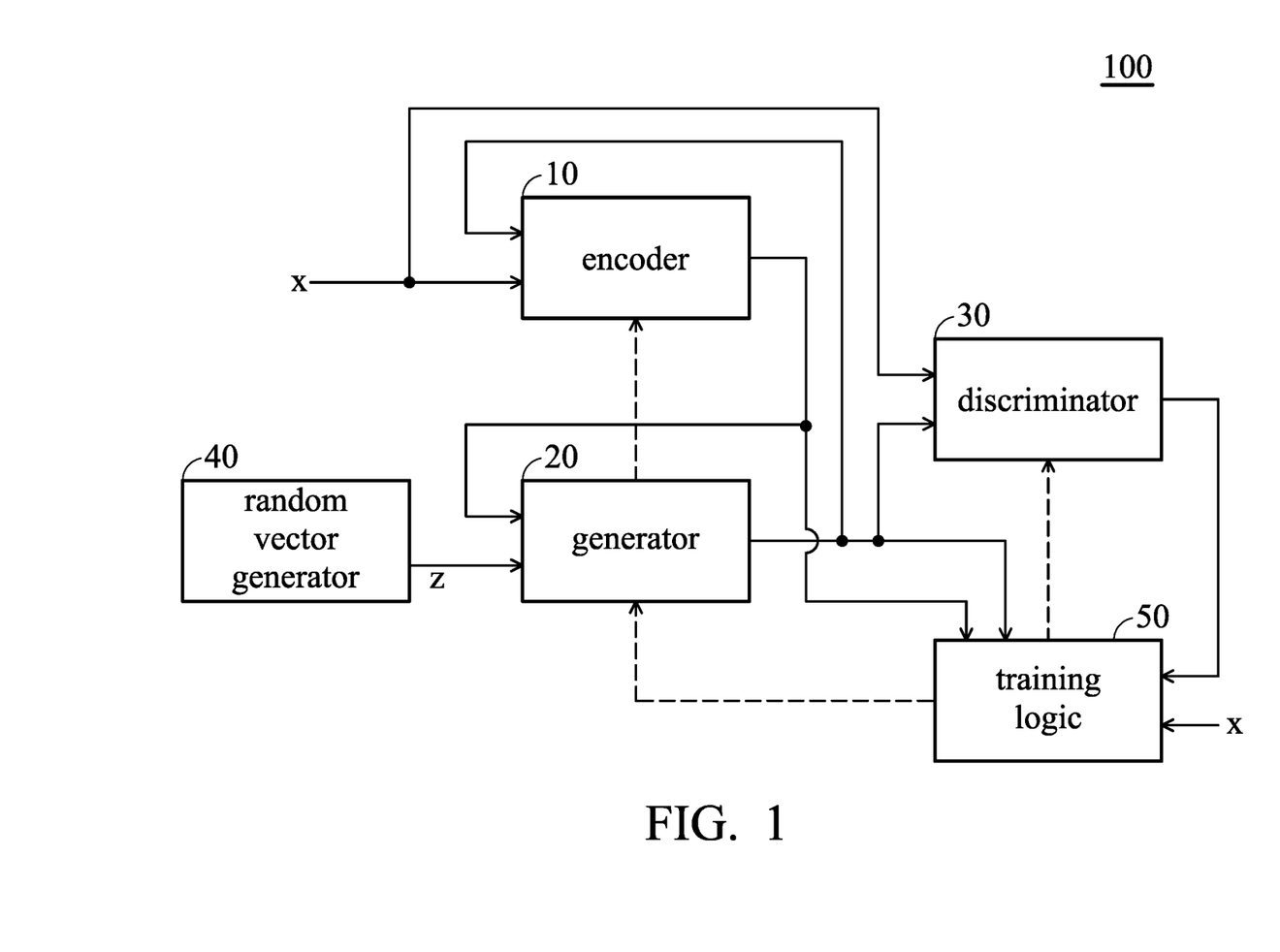
FIG. 1 is a block diagram of implementing an anomaly detection method for training the generative adversarial network in accordance with one embodiment.

Please refer to FIG. 1, FIG. 1 is a block diagram of implementing an anomaly detection method for training the generative adversarial network 100 in accordance with one embodiment. As shown in FIG. 1, the generative adversarial network 100 of this embodiment includes an encoder 10, a generator 20, a discriminator 30, a random vector generator 40, and a training logic 50. The generative adversarial network 100 can be implemented by using, for example, a laptop, a tablet, a mobile phone, or other electronic devices with computing capabilities. Take a general computer system as an example. A general computer system at least includes a processor and a memory, where the memory can be used to store a program code composed of a plurality of instructions, where the program code can be loaded into the processor for execution, and used to generate the encoder 10, the generator 20, the discriminator 30, the random vector generator 40 and the training logic 50 in the generative adversarial network 100. The memory can be implemented by read-only memory, flash memory, floppy disk, hard disk, optical disk, flash drive, tape, database accessible by the network, or storage with the same functions that can be easily thought of by those familiar with this technique.

In the embodiment, the encoder 10, the generator 20, the discriminator 30, the random vector generator 40, and the training logic 50 can also be implemented by integrated circuits, such as micro controller, microprocessor, Digital Signal Processor (DSP), Field Programmable Gate Array (FPGA), Application Specific Integrated Circuit (ASIC) or a logic circuit. In an embodiment, the encoder 10, the generator 20, the discriminator 30, the random vector generator 40 and the training logic 50 can also be implemented by software or firmware, respectively.

In the embodiment, the normal signal $x=\{x_1, x_2, \ldots, x_N\}$ is regarded as the single-type training data. Where N is a positive integer, representing the number of samples used as the normal signal for training. The normal signal x in this embodiment can be a two-dimensional image, audio, three-dimensional image or other data that can be encoded. Taking a two-dimensional image as an example, the normal signal x can be the image data of the cloth texture surface, the image data of a display panel surface, or the surface state image of the test object obtained by the optical instrument in the automatic optical inspection system. For the convenience of processing, the normal signal x of the two-dimensional image can be uniformly adjusted to image data having the same dimension, for example, a two-dimensional image with a size of 32*32 pixels.

In an embodiment, the encoder 10, the generator 20, and the discriminator 30 can be implemented using the neural network model, such as Convolutional Neural Network (CNN), Recurrent Neural Network (RNN), or other neural network models.

In the embodiment, the encoder 10 is used to encode the input signal into a corresponding latent vector. For convenience of representation, the symbol E represents the internal parameters of the neural network such as the encoder 10, and the function E( ) represents the output of the encoder.

In the embodiment, the generator 20 is used to generate the synthesized signal using the input latent vector. For convenience of representation, the symbol G is used to represent the internal parameters of the neural network such as the generator 20, and the function G( ) is used to represent the output of the generator. In the embodiment, the synthesized signal generated by the generator 20 has the same dimension as the normal signal.

In the embodiment, the discriminator 30 is used to calculate the input signal (such as the normal signal x or the synthesized signal) to obtain a real value between 0 and 1 (discrimination value). The larger the discriminant value is (closer to 1), the higher the probability of real of the input signal is, and the smaller the discriminant value is (closer to 0), the higher the probability of fake of the input signal is. For convenience of representation, the symbol D represents the internal parameters of the neural network such as the discriminator 30, and the function D( ) represents the output of the discriminator. In a general generation adversarial network, there is an adversarial relationship between the generator 20 and the discriminator 30, that is, the purpose of training is to enable the discriminator 30 to output discriminant values close to 1 and close to 0 for real signals and fake signals, respectively. At the same time, the output of the generator 20 will be close to the real signal under the determination of the discriminator 30.

In the embodiment, the random vector generator 40 generates a plurality of corresponding random latent vectors z through random numbers. These random latent vectors z are used to generate abnormal signals different from the normal signal x in this embodiment. The processing is to sequentially input the random latent vector z to the generator 20 to generate a plurality of synthesized signals G(z) with the same dimension as the normal signal x, then the synthesized signals G(z) are sequentially input to the discriminator 30 to output the corresponding discriminant values D(G(z)). In addition, when a discriminant value D(G(z)) is under the predetermined threshold value TH, the corresponding synthesized signal is selected as the training synthesized abnormal signal. That is, the discriminator 30 is used to evaluate whether the corresponding synthesized signal G(z) is a normal class signal or not. Then, the possibility of the random latent vector z belongs to the distribution of E(x) can be further traced back. The goal is to select z that is not in the distribution of E(x). This is the exclusive concept in this embodiment. In this way, although the original training data are the single-type data (only including normal signals), the normal signals x can be used as the normal class data and the synthesized signals G(z) are used as the anomalous class training data for anomaly detection model training.

Figure 2A:
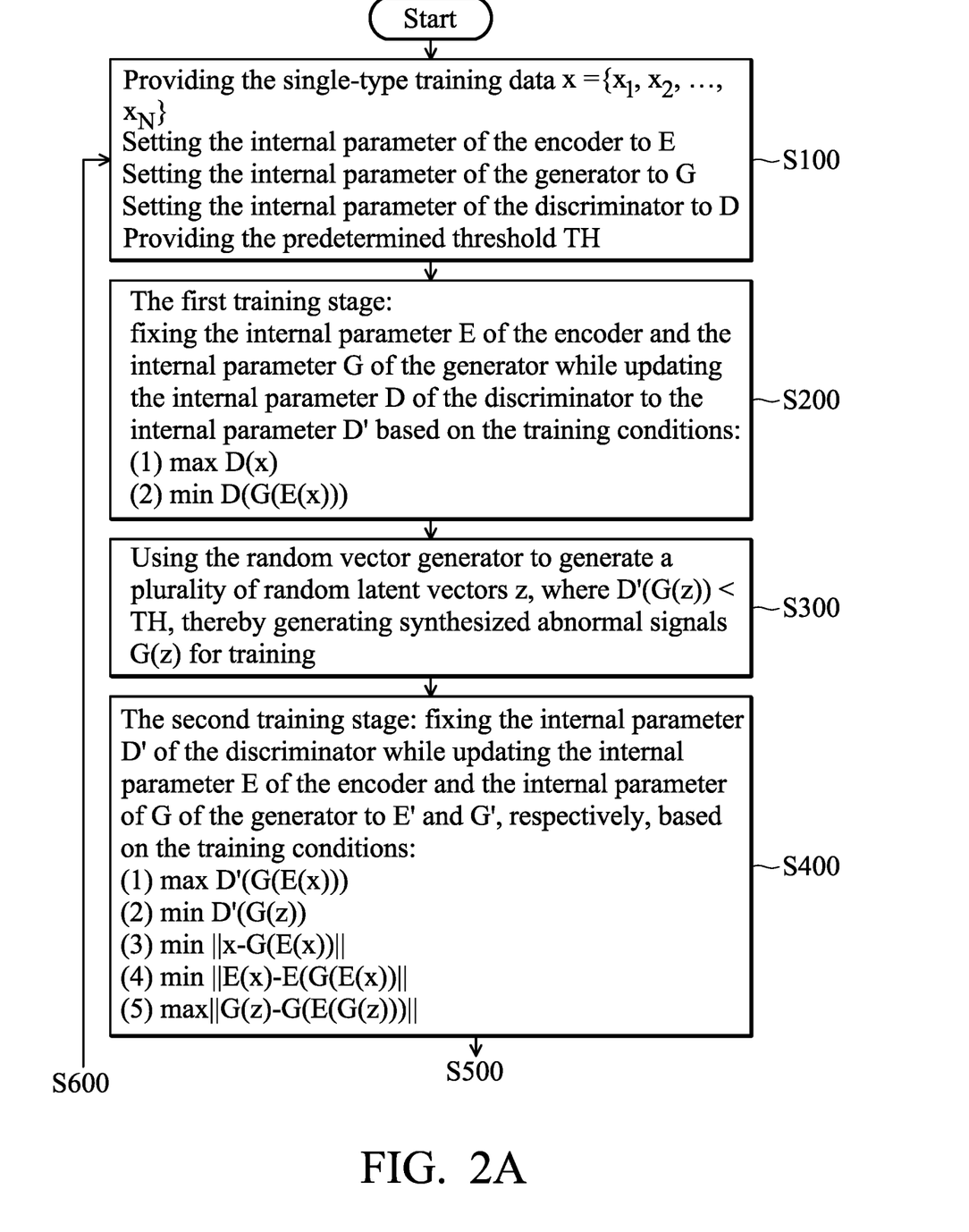
FIGS. 2A-2B are flowcharts of implementing an anomaly detection method for training the generative adversarial network in accordance with one embodiment.
Figure 2B:
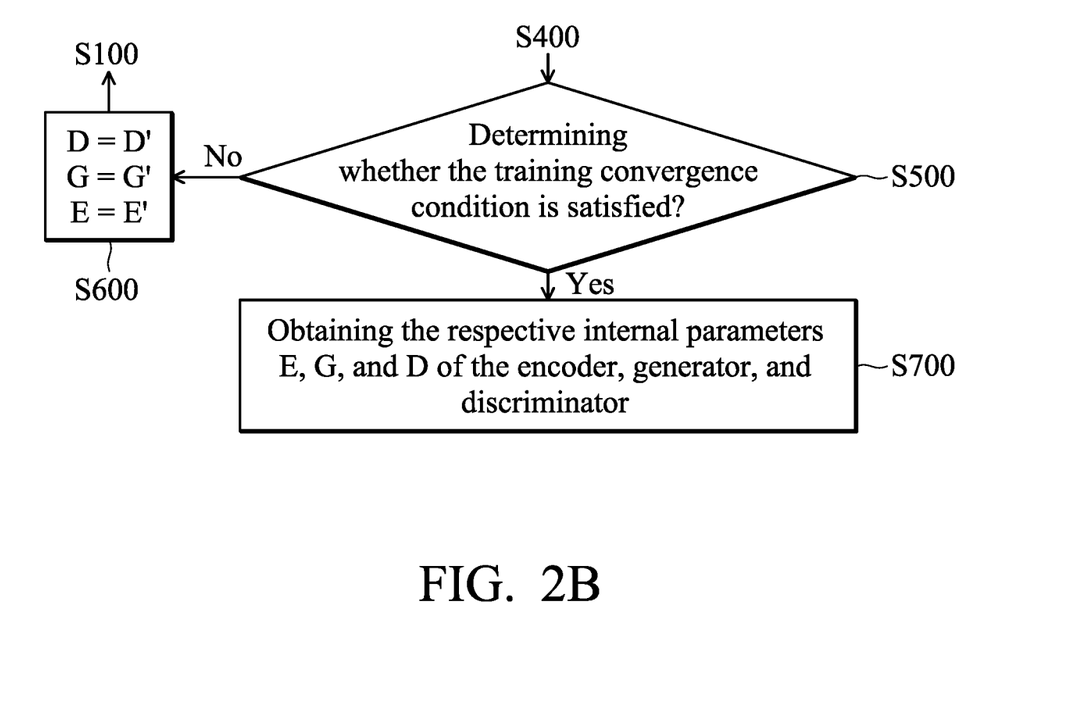

As shown in FIG. 1, the training logic 50 can adjust the respective internal parameters E, G and D of the encoder 10, the generator 20, and the discriminator 30 according to the predetermined training conditions based on the input normal signal x and the outputs of the encoder 10, the generator 20 and the discriminator 30. When the training logic 50 determines that a training convergence condition is satisfied, the respective internal parameters E, G, and D of the encoder 10, the generator 20, and the discriminator 30 are output at this time. The training logic 50 is shown in FIGS. 2A-2B and is described in detail in conjunction with the diagram below. In an embodiment, the convergence condition may be defined in advance, for example, the number of training epochs is set to 100.

FIGS. 2A-2B are flowcharts of implementing an anomaly detection method for training the generative adversarial network 100 in accordance with one embodiment of the present embodiment.

As shown in FIGS. 2A-2B, the initial state of the generative adversarial network 100 is in step S100. The single-type training data x={$x_1, x_2, \ldots, x_N$}. For example, it can be N normal surface image data of the test object, and the image data dimensions are 32*32 pixels. N is a positive integer. At this time, the internal parameter of the encoder 10 is set to E, the internal parameter of the generator 20 is set to G, and the internal parameter of the discriminator 30 is set to D. The predetermined threshold TH is set to distinguish the training synthesized abnormal signal G(z) from the normal signal x. The value of TH is between 0 and 1. For example, it can be set to 0.5 or 0.7.

In step S200, the first training stage is performed, the internal parameter E of the encoder 10 and the internal parameter G of the generator 20 are fixed while the internal parameter D of the discriminator 30 is adjusted. The adjustment method is based on the training conditions (1) and (2):

$$\max D(x) \quad (1)$$

$$\min D(G(E(x))) \quad (2)$$

According to training condition (1), the single-type training data x from the normal signals are sequentially input to the discriminator 30 to aim to maximize the corresponding discriminant values D(x). On the other hand, according to the training condition (2), the single-type training data x from the normal signals are sequentially input to the encoder 10 to output the corresponding first latent vectors E(x). The corresponding first latent vectors E(x) are input to the generator 20 to generate the corresponding first reconstruction signals G(E(x)). Then the first reconstruction signals G(E(x)) are input to the discriminator 30 to aim to minimize the corresponding discriminant values D(G(E(x))). According to the training conditions (1) and (2), the internal parameter D of the discriminator 30 can be updated to the internal parameter D'.

In step S300, the random vector generator 40 is used to generate a plurality of random latent vectors z, where D'(G(z))<TH, thereby generating synthesized abnormal signals G(z) for training. In the implementation of this embodiment, the number of training synthesized abnormal signals G(z) can be less than N (that is, the number of normal signal samples).

In step S400, the second training stage is performed, the internal parameter D' of the discriminator 30 is fixed while the internal parameter E of the encoder 10 and the internal parameter G of the generator 20 are adjusted. The adjustment method is based on the training conditions (3)-(7):

$$\max D'(G(E(x))) \quad (3)$$

$$\min D'(G(z)) \quad (4)$$

$$\min \|x-G(E(x))\| \quad (5)$$

$$\min \|E(x)-E(G(E(x)))\| \quad (6)$$

$$\max \|G(z)-G(E(G(z)))\| \quad (7)$$

According to the training condition (3), the first reconstruction signals G(E(x)) are input to the discriminator 30 to aim to maximize the corresponding discriminant values D'(G(E(x))). As mentioned above, it has an adversarial relationship with training condition (2). As mentioned above, the synthesized signals G(z) are treated as the training abnormal signals to be opposite to the normal signals x. Therefore, according to the training condition (4), the training synthesized abnormal signals G(z) are input to the discriminator 30 to aim to minimize the corresponding discriminant values D'(G(z)).

In addition, according to the training conditions (5)-(7), the goal is minimizing the first error value $\|x-G(E(x))\|$ and the second error value $\|E(x)-E(G(E(x)))\|$ while maximizing the third error value $\|G(z)-G(E(G(z)))\|$. The first error value is calculated by accumulating the distance values between the normal signals x and the corresponding first reconstruction signals G(E(x)). The second error values is calculated by accumulating the distance values between the first latent vectors E(x) and the corresponding second latent vectors E(G(E(x))). The third error values is calculated by accumulating the distance values between the training synthesized abnormal signals G(z) and the corresponding second reconstruction signals G(E(G(z))). It should be noted that the above training objective is a relative concept of maximization (max) or minimization (min). During implementation, a minus sign or mathematical operation can be added to adjust the implementation method according to the consistency of implementation, which does not violate the spirit of the embodiments of the present disclosure.

It should be specifically noted that, according to the training condition (7), in this embodiment, the reconstruction error between the training synthesized abnormal signal G(z) (representing an abnormal signal) and the second reconstruction signal G(E(G(z))) generated by the encoder 10 and generator 20 is maximized. This achieves the characteristics of the exclusive generative adversarial network architecture in this embodiment. After completing the second training stage, the internal parameter E of the encoder 10 and the internal parameter G of the generator 20 are updated to E' and G'.

In step S500, it is determined whether the training convergence condition is satisfied. For example, the number of training epochs can be preset to 100.

In step S600, when the training convergence condition has not been satisfied, return to step S100 via step S600. In step S600, the current internal parameters E', G', D' of the encoder 10, generator 20, and discriminator 30 are set to the internal parameters E, G, D of the encoder 10, generator 20, and discriminator 30, respectively.

In step S700, when the training convergence condition is satisfied, the respective internal parameters E, G, and D of the encoder 10, generator 20, and discriminator 30 at this time can be obtained. In this way, the exclusive generative adversarial network of this embodiment can be obtained to implement the anomaly detection device and the anomaly detection method.

Figure 3:
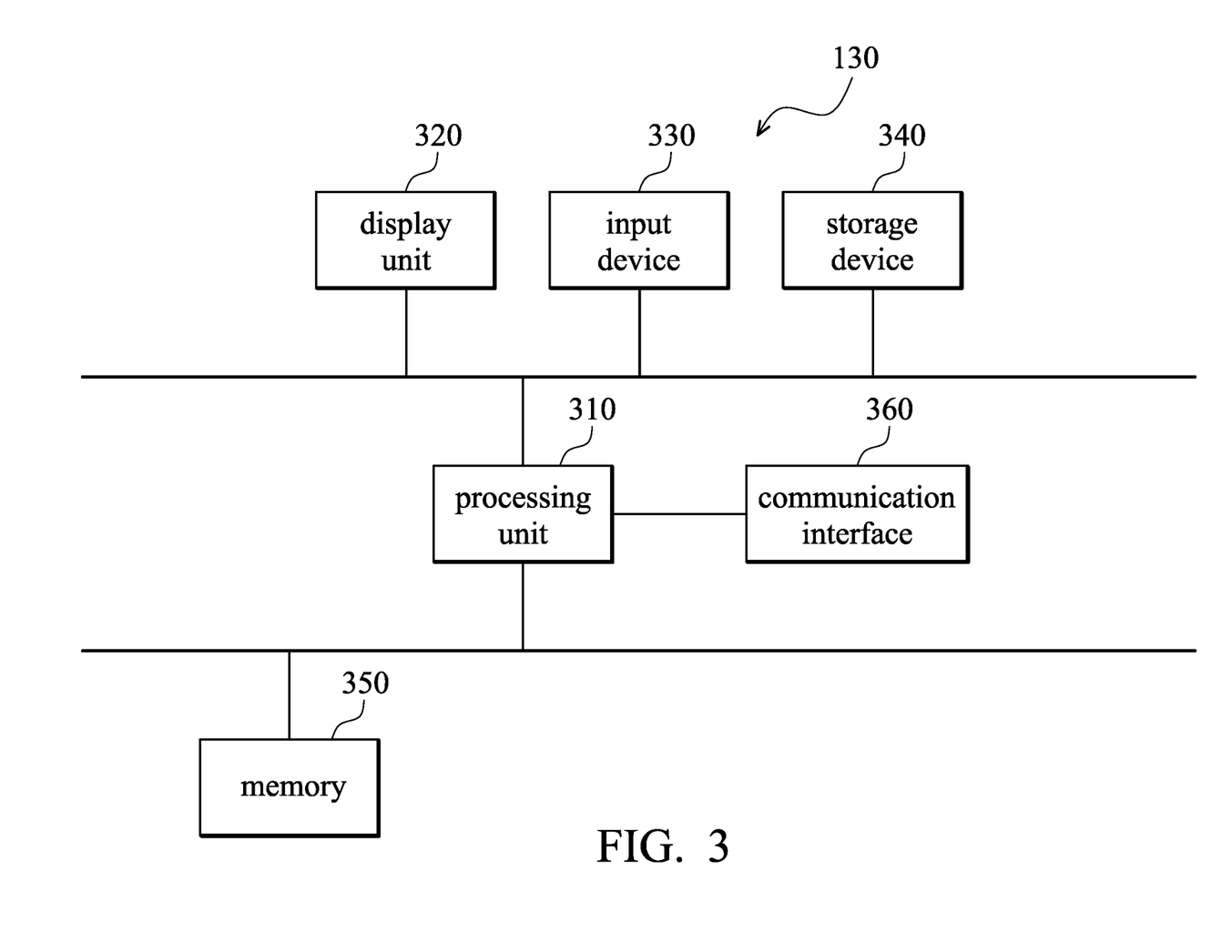
FIG. 3 is a block diagram of a computer system for implementing the anomaly detection device and anomaly detection method in accordance with one embodiment.

FIG. 3 is a block diagram of a computer system 130 for implementing the anomaly detection device and anomaly detection method in accordance with one embodiment. The architecture of the computer system 130 can be implemented in a desktop computer, a notebook computer, or other electronic devices with computing capabilities. The processing unit 310 can be implemented in a variety of ways, such as a dedicated hardware circuit or a general-purpose hardware (for example, a single processor, a multi-processor with parallel processing capabilities, a graphics processor, or other processors with computing capabilities), and when running code or software, it provides the aforementioned anomaly detection function. The system architecture also includes a memory 350 for storing data needed during execution, such as variables, data tables, etc., and a storage device 340 for storing various electronic files, such as web pages, documents, audio files, video files, etc. The system architecture further includes a communication interface 360, so that the processing unit 310 can communicate with other electronic devices. The communication interface 360 can be a local area network communication module or a wireless local area network communication module. The input device 330 may include a keyboard, a mouse, a touch panel, etc. The user can press hard keys on the keyboard to input characters, operate the mouse to control the cursor, or make gestures on the touch panel to control the running application. Gestures can include single-click, double-click, single-finger drag, multi-finger drag, etc., but are not limited to herein. The display unit 320 may include a display panel (for example, a thin-film liquid-crystal display panel, an organic light-emitting diode panel, or other panels with display capabilities) for displaying input characters, numbers, symbols, moving traces of a dragging cursor, and drawing patterns or screens provided by applications for users to watch.

The following uses a practical example to illustrate the content of the embodiments of the present disclosure. The following table 1 is the cloth texture abnormal detection situation (divided into automatic prediction and manual labeling) without using the exclusive generative adversarial network of this embodiment. Table 2 shows the cloth texture anomaly detection situation (divided into automatic prediction and manual labeling) using the exclusive generative adversarial network of this embodiment. The two are comparison group. Assume that the training normal images (real data x) used in the experiment are 1000 cloth images, while the test normal images have 9730 images, and the test abnormal images have 3336 images.

TABLE 1

| Total correct rate (%) | Total error rate (%) | without using the exclusive generative adversarial network (automatic prediction) | | | |
|---|---|---|---|---|---|
| 93.98 | 6.02 | | abnormal | normal | number of test images | recall/precision (%) |
| manual labeling | abnormal | 3336 | 0 | 3336 | 100/80.91 |
| | normal | 787 | 8943 | 9730 | FNR/TNR(%) |
| Sum up | | 4123 | 8943 | 13066 | 0/91.91 |

TABLE 2

| Total correct rate (%) | Total error rate (%) | using the exclusive generative adversarial network (automatic prediction) | | | |
|---|---|---|---|---|---|
| 96.14 | 3.86 | | abnormal | normal | number of test images | recall/precision (%) |
| manual labeling | abnormal | 3336 | 0 | 3336 | 100/86.88 |
| | normal | 504 | 9226 | 9730 | FNR/TNR(%) |
| Sum up | | 3840 | 9226 | 13066 | 0/94.82 |

Taking Table 1 as an example, the recall rate is obtained by dividing the correct number of automatically predicted abnormally images (3336) by the total number of manually labeled abnormal images (3336). The precision rate is obtained by dividing the correct number of automatically predicted abnormally images (3336) by the total number of automatically predicted abnormally images (4123).

In one embodiment, the false negative rate (FNR) is obtained by dividing the incorrect number of automatically predicted normally images (0) by the total number of manually labeled abnormal images (3336), that is, 1—recall. The true negative rate (TNR) is obtained by dividing the correct number of automatically predicted normally images (8943) by the total number of manually labeled normal images (9730).

In one embodiment, the total correct rate is obtained by dividing the total number of automatically predicted correct images (3336+8943) by the total number of test images (13066). The total error rate is 1—the total correct rate.

The calculation method of table 2 is the same as that of table 1, so it is not repeated here. It can be seen from table 1 and table 2 that when the recall rate (recall) is set to 100%, the precision rate without using the exclusive generative adversarial network of this embodiment is 80.91%, and the precision rate of using the exclusive generative adversarial network of this embodiment is 86.88%. Therefore, the use of the exclusive generative adversarial network of this embodiment improves the precision of determining whether the input data is normal or abnormal.

In some fields, for example, when taking images of related products in the semiconductor field for defect detection, since the yield rate of the semiconductor field is high, it is easier to find normal product images as training data, but it is not easy to find abnormal products as training materials. The anomaly detection device and the anomaly detection method shown in the embodiments of the present disclosure can generate synthesized signals with the same dimension as normal signals by a generator using random latent vectors generated by random numbers. These synthesized signals are sequentially input to the discriminator to generate corresponding discriminant values. When the discriminant value is under the predetermined threshold, the corresponding synthesized signal is selected as the training synthesized abnormal signal. Using real normal signals as the normal class data and synthetic abnormal signals as the anomalous class data, anomaly detection model training can be performed. In other words, the anomaly detection device and anomaly detection method shown in the embodiments of the present disclosure not only can collect real normal data to train the model, but also can generate synthesized abnormal data to train the model, so as to achieve the purpose of generating defect training data for imbalanced class data issue. The purpose is to establish an anomaly detection model that can more accurately determine whether the input data is normal or abnormal.

One embodiment of an anomaly detection device based on a generative adversarial network architecture is provided, wherein the anomaly detection device uses the single-type training data composed of a group of normal signals to train an anomaly detection model. The anomaly detection device includes: an encoder, a generator, a discriminator and a random vector generator. The encoder is configured to encode an input signal into an output latent vector. The generator is connected to the encoder. The generator is configured to generate a synthesized signal using an input latent vector. The synthesized signal has the same dimension as the normal signal. The discriminator is connected to the generator. The discriminator is configured to determine whether the input signal is real or fake and output a discriminant value discriminator. The random vector generator is configured to generate a plurality of random latent vectors. In addition, the anomaly detection model training comprises the first training stage and the second training stage, the random latent vectors are sequentially input to the generator to generate a plurality of synthesized signals with the same dimension as the normal signals; each one of the synthesized signals is input in sequence into the discriminator to generate a corresponding discriminant value, and when one of the discriminant values is under the predetermined threshold, the corresponding synthesized signal is selected as a training synthesized abnormal signal.

In one embodiment, the encoder, the generator, and the discriminator are respectively composed of a neural network. In one embodiment, the larger the discriminant value is, the higher the probability of real of the input signal is, and the smaller the discriminant value is, the higher the probability of fake of the input signal is. In one embodiment, the anomaly detection device uses the training synthesized abnormal signals as the anomalous class data, and the normal signals as the normal class data for anomaly detection model training. In one embodiment, the discriminator is trained while a plurality of internal parameters of the encoder and the generator are fixed in the first training stage, and the single-type training data from the normal signals are sequentially input into the encoder to output the corresponding first latent vectors, and then the corresponding first latent vectors are input into the generator, so as to generate the corresponding first reconstruction signals. In one embodiment, in the first training stage, a plurality of internal parameters of the discriminator are adjusted with the goal of making the corresponding discriminant values smaller when the first reconstruction signals are input into the discriminator, and the internal parameters of the discriminator are adjusted with the goal of making the corresponding discriminant values larger when the single-type training data from the normal signals are input into the discriminator.

In one embodiment, in the second training stage, the internal parameters of the discriminator are fixed while the encoder and the generator are trained, and the first reconstruction signals are sequentially input into the encoder to output the second latent vectors, then each one of the training synthesized abnormal signals is input into the encoder to output the third latent vectors, and the third latent vectors are input into the generator to generate the second reconstruction signals. In one embodiment, the first error value is calculated by accumulating the distance values between the normal signals and the corresponding first reconstruction signals, the second error value is calculated by accumulating the distance values between the first latent vectors and the corresponding second latent vectors, and the third error value is calculated by accumulating the distance values between the training synthesized abnormal signals and the corresponding second reconstruction signals. In one embodiment, in the second training stage, the internal parameters of the encoder and the generator are adjusted with the goal of making the corresponding discriminant values larger when the first reconstruction signals are input into the discriminator, and the internal parameters of the generator are adjusted with the goal of making the corresponding discriminant value smaller when the training synthesized abnormal signals are input into the discriminator, moreover, the internal parameters of the encoder and the generator are adjusted with the goal of making the first error value and the second error value smaller, and the third error value larger.

In one embodiment, the normal signals can be image data of a cloth texture surface, image data of a display panel surface or image data of the surface state of the test object obtained by an optical instrument in an automatic optical inspection system.

One embodiment of an anomaly detection method suitable for a system comprising a processor and a memory is provided. The memory includes a plurality of instructions that can be executed by the processor, and the processor is configured to implement the anomaly detection method based on a generative adversarial network. The anomaly detection method for training the generative adversarial network comprises the following steps: providing the single-type training data composed of a group of normal signals; training a discriminator of the generative adversarial network while fixing a plurality of internal parameters of an encoder and a generator of the generative adversarial network in the first training stage, and inputting the single-type training data from the normal signals sequentially into the encoder to output the corresponding first latent vectors, and then inputting the corresponding first latent vectors into the generator, so as to generate the corresponding first reconstruction signals; in the first training stage, adjusting the internal parameters of the discriminator with the goal of making the corresponding discriminant values smaller when inputting the first reconstruction signals into the discriminator, and adjusting the internal parameters of the discriminator with the goal of making the corresponding discriminant values larger when inputting the single-type training data from the normal signals into the discriminator; and generating a plurality of random latent vectors and inputting them into the generator to generate a plurality of synthesized signals with the same dimension as the normal signals; wherein each one of the synthesized signals is input in sequence into the discriminator to output a corresponding discriminant value, and when one of the discriminant values is under the predetermined threshold, the corresponding synthesized signal is selected as a training synthesized abnormal signal.

In one embodiment of the anomaly detection method, the internal parameters of the discriminator are fixed while the encoder and the generator are trained in the second training stage, the first reconstruction signals are input sequentially into the encoder to output the second latent vectors, then each one of the training synthesized abnormal signals is input into the encoder to output the third latent vectors, and the third latent vectors are input into the generator to generate the second reconstruction signals. The first error value is calculated by accumulating the distance values between the normal signals and the corresponding first reconstruction signals, the second error value is calculated by accumulating the distance values between the first latent vectors and the corresponding second latent vectors, and the third error value is calculated by accumulating the distance values between the training synthesized abnormal signals and the corresponding second reconstruction signals.

In one embodiment of the anomaly detection method, in the second training stage, the internal parameters of the encoder and the generator are adjusted with the goal of making the corresponding discriminant values larger when the first reconstruction signals are input into the discriminator, the internal parameters of the generator are adjusted with the goal of making the corresponding discriminant values smaller when the training synthesized abnormal signals are input into the discriminator, and the internal parameters of the encoder and the generator are adjusted with the goal of making the first error value and the second error value smaller, and the third error value larger.

In one embodiment, the anomaly detection method further includes that when a predetermined training convergence condition is not satisfied, use the current internal parameters of the encoder, the generator, and the discriminator and return to the first training stage; and when the predetermined training convergence condition is satisfied, use the current internal parameters of the encoder, the generator and the discriminator to set the generative adversarial network.

Although the disclosure has been illustrated and described with respect to one or more implementations, equivalent alterations and modifications will occur or be known to others skilled in the art upon the reading and understanding of this specification and the annexed drawings. In addition, while a particular feature of the disclosure may have been disclosed with respect to only one of implementations, such a feature may be combined with one or more other features of the other implementations as may be desired and advantageous for any given or particular application.

What is claimed is:

1. An anomaly detection device based on a generative adversarial network architecture, wherein the anomaly detection device uses single-type training data composed of a plurality of normal signals to train an anomaly detection model, the anomaly detection device comprising:
    an encoder, configured to encode an input signal into an output latent vector;
    a generator, connected to the encoder, wherein the generator is configured to generate a synthesized signal using an input latent vector, and the synthesized signal has a same dimension as the plurality of normal signals;
    a discriminator, connected to the generator, wherein the discriminator is configured to determine whether the input signal is real or fake and output a discriminant value; and
    a random vector generator, configured to generate a plurality of random latent vectors;
    wherein the anomaly detection model training comprises a first training stage and a second training stage, the random latent vectors are sequentially input to the generator to generate a plurality of synthesized signals with the same dimension as the plurality of normal signals, each one of the plurality of synthesized signals is input in sequence into the discriminator to output the discriminant value corresponding to that synthesized signal, and one or more of the plurality of synthesized signals that correspond to the discriminant value below a predetermined threshold are selected as training synthesized abnormal signals;
    wherein when the discriminator is trained in the first training stage, a plurality of internal parameters of the encoder and the generator are fixed, and the plurality of normal signals from the single-type training data are sequentially input into the encoder to output a plurality of first latent vectors that correspond to the plurality of normal signals, and then the plurality of first latent vectors are input into the generator, so as to generate a plurality of first reconstruction signals that correspond to the plurality of first latent vectors;
    wherein the encoder and the generator are trained in the second training stage while the plurality of internal parameters of the discriminator are fixed, and the plurality of first reconstruction signals are sequentially input into the encoder to output a plurality of second latent vectors, then each one of the training synthesized abnormal signals is input into the encoder to output a plurality of third latent vectors, and the plurality of third latent vectors are input into the generator to generate a plurality of second reconstruction signals; and
    wherein a first error value is calculated by accumulating a distance value between each of the plurality of normal signals and the first reconstruction signal corresponding to that normal signal, a second error value is calculated by accumulating the distance value between each of the first latent vectors and the second latent vector corresponding to that first latent vector, and a third error value is calculated by accumulating the distance value between each of the training synthesized abnormal signals and the second reconstruction signal corresponding to that training synthesized abnormal signal.

2. The anomaly detection device of claim 1, wherein the encoder, the generator, and the discriminator are respectively composed of a neural network.

3. The anomaly detection device of claim 1, wherein a larger discriminant value represents a higher probability of the input signal being real.

4. The anomaly detection device of claim 3, wherein the anomaly detection device uses the training synthesized abnormal signals as anomalous class data and the plurality of normal signals as the normal class data for anomaly detection model training.

5. The anomaly detection device of claim 1, wherein when the discriminator is trained in the first training stage, a plurality of internal parameters of the discriminator are adjusted to minimize the discriminant value when the plurality of first reconstruction signals are input into the discriminator, and the plurality of internal parameters of the discriminator are adjusted to maximize the discriminant value when the plurality of normal signals from the single-type training data are input into the discriminator.

6. The anomaly detection device of claim 1, wherein when the encoder and the generator are trained in the second training stage, the plurality of internal parameters of the encoder and the generator are adjusted to maximize the discriminant values when the plurality of first reconstruction signals are input into the discriminator, and the plurality of internal parameters of the generator are adjusted to minimize the discriminant value when the training synthesized abnormal signals are input into the discriminator, and wherein the plurality of internal parameters of the encoder and the generator are adjusted to minimize first error value and the second error value and maximize the third error value.

7. The anomaly detection device of claim 1, wherein the plurality of normal signals are image data of a cloth texture surface.

8. The anomaly detection device of claim 1, wherein the plurality of normal signals are image data of a display panel surface.

9. The anomaly detection device of claim 1, wherein the plurality of normal signals are image data of a surface state of a test object obtained by an optical instrument in an automatic optical inspection system.

10. The anomaly detection device of claim 1, wherein the predetermined threshold is set to distinguish the training synthesized abnormal signals from the plurality of normal signals.

11. An anomaly detection method is suitable for a system comprising a processor and a memory, wherein the memory comprises a plurality of instructions that can be executed by the processor, and the processor is configured to implement the anomaly detection method based on a generative adversarial network, wherein the anomaly detection method for training the generative adversarial network comprises the following steps:
    providing single-type training data composed of a plurality of normal signals;
    in a first training stage, training a discriminator of the generative adversarial network while fixing a plurality of internal parameters of an encoder and a generator of the generative adversarial network, and inputting the plurality of normal signals from the single-type training data sequentially into the encoder to output a plurality of first latent vectors that correspond to the plurality of normal signals, and then inputting the plurality of first latent vectors into the generator, so as to generate a plurality of first reconstruction signals that correspond to the plurality of first latent vectors;

in the first training stage, adjusting a plurality of internal parameters of the discriminator to minimize a discriminant value output by the discriminator when inputting the plurality of first reconstruction signals into the discriminator, and adjusting the internal parameters of the discriminator to maximize the discriminant values when inputting the plurality of normal signals from the single-type training data into the discriminator; and generating a plurality of random latent vectors, inputting the plurality of random latent vectors into the generator to generate a plurality of synthesized signals with a same dimension as the plurality of normal signals, wherein each one of the plurality of synthesized signals is input in sequence into the discriminator to output the discriminant value corresponding to that synthesized signal, and one or more of the plurality of synthesized signals that correspond to the discriminant value below a predetermined threshold are selected as training synthesized abnormal signals;

in a second training stage, training the encoder and the generator while fixing the plurality of internal parameters of the discriminator, inputting the plurality of first reconstruction signals sequentially into the encoder to output a plurality of second latent vectors, inputting each one of the plurality of training synthesized abnormal signals into the encoder to output a plurality of third latent vectors, and inputting the plurality of third latent vectors into the generator to generate a plurality of second reconstruction signals, wherein a first error value is calculated by accumulating a distance value between each of the plurality of normal signals and the first reconstruction signal corresponding to that normal signal, a second error value is calculated by accumulating the distance value between each of the first latent vectors and the second latent vector corresponding to that first latent vector, and a third error value is calculated by accumulating the distance value between each of the training synthesized abnormal signals and the second reconstruction signal corresponding to that training synthesized abnormal signal.

12. The anomaly detection method of claim 11, further comprising:
in the second training stage, adjusting the internal parameters of the encoder and the generator to maximize the discriminant values when inputting the plurality of first reconstruction signals into the discriminator;

adjusting the plurality of internal parameters of the generator to minimize the discriminant values smaller when inputting the training synthesized abnormal signals into the discriminator; and adjusting the plurality of internal parameters of the encoder and the generator to minimize the first error value and the second error value and maximize the third error value.

13. The anomaly detection method of claim 12, further comprising:
when a predetermined training convergence condition is not satisfied, using current internal parameters of the encoder, the generator, and the discriminator and returning to the first training stage; and when the predetermined training convergence condition is satisfied, using the current internal parameters of the encoder, the generator and the discriminator to set the generative adversarial network.

14. The anomaly detection method of claim 11, wherein the encoder, the generator, and the discriminator are respectively composed of a neural network.

15. The anomaly detection method of claim 11, wherein the predetermined threshold is set to distinguish the training synthesized abnormal signals from the plurality of normal signals.

* * * * *